(12) United States Patent
Kim et al.

(10) Patent No.: US 12,430,676 B2
(45) Date of Patent: Sep. 30, 2025

(54) METHOD AND ELECTRONIC DEVICE FOR RECOGNIZING PRODUCT

(71) Applicant: Samsung Electronics Co., Ltd., Suwon-si (KR)

(72) Inventors: Kyungsu Kim, Suwon-si (KR); Ohjoon Kwon, Suwon-si (KR); Younguk Kim, Suwon-si (KR); Hyunsoo Choi, Suwon-si (KR); Yehoon Kim, Suwon-si (KR); Hyunhan Kim, Suwon-si (KR); Hyosang Kim, Suwon-si (KR); Hyungmin Lee, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 392 days.

(21) Appl. No.: 18/148,629

(22) Filed: Dec. 30, 2022

(65) Prior Publication Data
US 2023/0206298 A1    Jun. 29, 2023

Related U.S. Application Data

(63) Continuation of application No. PCT/KR2022/020670, filed on Dec. 19, 2022.

(30) Foreign Application Priority Data

Dec. 29, 2021   (KR) .................. 10-2021-0191652
Jun. 24, 2022   (KR) .................. 10-2022-0077805

(51) Int. Cl.
G06V 30/14      (2022.01)
G06Q 30/0601    (2023.01)
G06V 10/80      (2022.01)

(52) U.S. Cl.
CPC ....... *G06Q 30/0627* (2013.01); *G06V 10/806* (2022.01); *G06V 30/1444* (2022.01)

(58) Field of Classification Search
CPC .. G06Q 30/0627; G06V 10/806; G06V 10/74; G06V 10/764; G06V 10/82; G06V 20/62; G06V 30/1444; G06V 30/18
See application file for complete search history.

(56) References Cited

U.S. PATENT DOCUMENTS 7,610,306 B2    10/2009   Lin et al.
2016/0042251 A1*  2/2016  Cordova-Diba ...... G06F 16/583
                                                    382/199
(Continued)

FOREIGN PATENT DOCUMENTS

CN   113570427 A   10/2021
CN   113850201 A   12/2021
(Continued)

OTHER PUBLICATIONS

Mafla et al, Fine-grained Image Classification and Retrieval by Combining Visual and Locally Pooled Textual Features, 2020, arXiv: 2001.04732v1, pp. 1-10. (Year: 2020).*
(Continued)

*Primary Examiner* — Kathleen M Broughton
(74) *Attorney, Agent, or Firm* — Jefferson IP Law, LLP

(57) ABSTRACT

A method and electronic device for recognizing a product are provided. The method includes obtaining first feature information and second feature information from an image related to a product, obtaining fusion feature information based on the first feature information and the second feature information by using a main encoder model that reflects a correlation between feature information of different modalities, matching the fusion feature information against a database of the product, and providing information about the product, based on a result of the matching.

19 Claims, 12 Drawing Sheets

(56) References Cited

U.S. PATENT DOCUMENTS

| | | | |
|---|---|---|---|
| 2017/0255648 A1* | 9/2017 | Dube | G06V 10/40 |
| 2020/0257922 A1 | 8/2020 | Huang et al. | |
| 2021/0209394 A1 | 7/2021 | Hwang et al. | |
| 2021/0256051 A1 | 8/2021 | Wang et al. | |
| 2021/0271870 A1 | 9/2021 | Ni et al. | |
| 2021/0303939 A1* | 9/2021 | Hu | G06V 10/25 |
| 2021/0312205 A1* | 10/2021 | Meidar | G06N 3/02 |

FOREIGN PATENT DOCUMENTS

| | | |
|---|---|---|
| JP | 2019-049945 A | 3/2019 |
| JP | 7162417 B2 | 10/2022 |
| JP | 7170210 B2 | 11/2022 |
| KR | 10-0742288 B1 | 5/2007 |
| KR | 10-2189373 B1 | 12/2020 |
| KR | 10-2279797 B1 | 7/2021 |
| KR | 10-2021-0104571 A | 8/2021 |
| KR | 10-2284676 B1 | 8/2021 |
| KR | 10-2021-0125955 A | 10/2021 |
| KR | 10-2455616 B1 | 10/2022 |

OTHER PUBLICATIONS

Lin et al, PAM: Understanding Product Images in Cross Product Category Attribute Extraction, 2021, arXiv: 2106.04630v1, pp. 1-9. (Year: 2021).*

International Search Report dated Mar. 23, 2023, issued in International Patent Application No. PCT/KR2022/020670.

Hu et al., A Multimodal Fusion Framework for Brand Recognition From Product Image and Context; 2020 IEEE International Conference on Multimedia & Expo Workshops (Icmew); IEEE; XP033808366; Jul. 6, 2020.

Extended European Search Report dated Jan. 14, 2025; European Appln. No. 22916574.1-1207.

* cited by examiner

METHOD AND ELECTRONIC DEVICE FOR RECOGNIZING PRODUCT

CROSS-REFERENCE TO RELATED APPLICATION(S)

This application is a continuation application, claiming priority under § 365(c), of an International application No. PCT/KR2022/020670, filed on Dec. 19, 2022, which is based on and claims the benefit of a Korean patent application number 10-2021-0191652, filed on Dec. 29, 2021, in the Korean Intellectual Property Office, and of a Korean patent application number 10-2022-0077805, filed on Jun. 24, 2022, in the Korean Intellectual Property Office, the disclosure of each of which is incorporated by reference herein in its entirety.

TECHNICAL FIELD

The disclosure relates to a method and electronic device for recognizing a product.

BACKGROUND ART

Unique identification codes such as barcodes or quick response (QR) codes for identifying products are attached to products. Because customers are unable to analyze the unique identification codes without a device such as a reader, labels are attached to the products for the customers.

Recently, due to the development of mobile devices such as smartphones, there has been growing interest in customers using their smartphones for product search or identification.

The above information is presented as background information only to assist with an understanding of the disclosure. No determination has been made, and no assertion is made, as to whether any of the above might be applicable as prior art with regard to the disclosure.

DESCRIPTION OF EMBODIMENTS

Technical Solution to Problem

Aspects of the disclosure are to address at least the above-mentioned problems and/or disadvantages and to provide at least the advantages described below. Accordingly, an aspect of the disclosure is to provide a method and electronic device for recognizing a product.

Additional aspects will be set forth in part in the description which follows and, in part, will be apparent from the description, or may be learned by practice of the presented embodiments.

In accordance with an aspect of the disclosure, a method of recognizing a product is provided. The method includes obtaining first feature information and second feature information from an image related to a product, obtaining fusion feature information based on the first feature information and the second feature information by using a main encoder model that reflects a correlation between feature information of different modalities, matching the fusion feature information against a database of the product, and providing information about the product, based on a result of the matching.

In accordance with another aspect of the disclosure, an electronic device for recognizing a product is provided. The electronic device includes a display, a memory storing one or more instructions, and a processor configured to execute the one or more instructions stored in the memory. The processor may be further configured to execute the one or more instructions to obtain first feature information and second feature information from an image related to a product, and obtain fusion feature information based on the first feature information and the second feature information by using a main encoder model that reflects a correlation between feature information of different modalities. The processor may be further configured to execute the one or more instructions to match the fusion feature information against a database of the product, and provide information about the product on the display, based on a result of the matching.

According to an embodiment of the disclosure, a computer-readable recording medium having recorded thereon a program for executing the above-described method may be provided.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF DRAWINGS

The above and other aspects, features, and advantages of certain embodiments of the disclosure will be more apparent from the following description taken in conjunction with the accompanying drawings, in which.

The same reference numerals are used to represent the same elements throughout the drawings.

MODE OF DISCLOSURE

Figure 1:
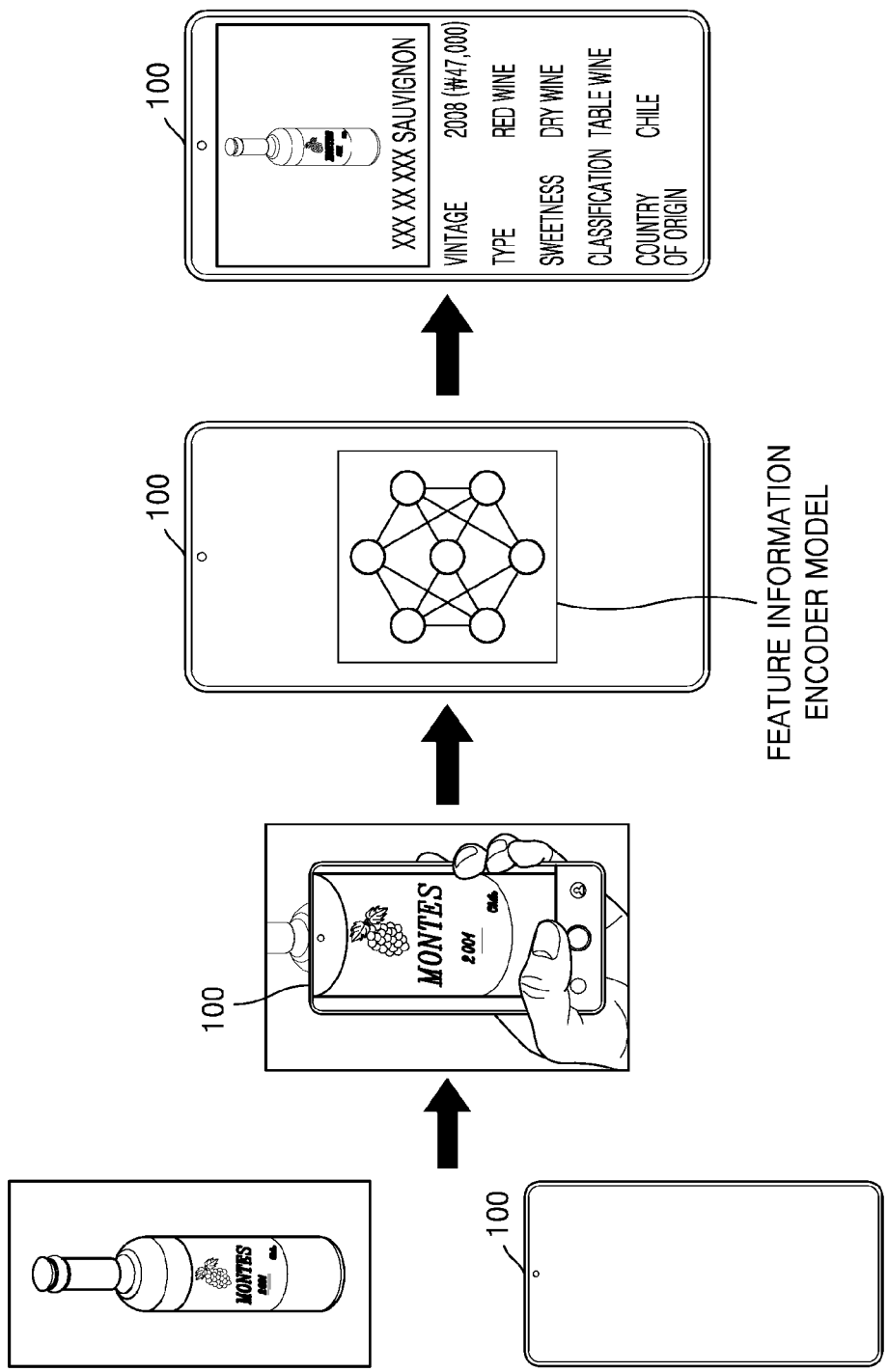
FIG. 1 is a diagram showing a product recognition process performed by an electronic device, according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Throughout the disclosure, the expression "at least one of a, b or c" indicates only a, only b, only c, both a and b, both a and c, both b and c, all of a, b, and c, or variations thereof.

Although the terms used herein are selected, as much as possible, from general terms that are widely used at present while taking into consideration the functions obtained in accordance with the disclosure, these terms may be replaced by other terms based on intentions of one of ordinary skill in the art, customs, emergence of new technologies, or the like. In a particular case, terms that are arbitrarily selected by the applicant may be used and, in that case, the meanings of these terms may be described in relevant parts of the disclosure. Therefore, it is noted that the terms used herein are construed based on practical meanings thereof and the whole content of this specification, rather than being simply construed based on names of the terms.

As used herein, the singular forms "a", "an", and "the" are intended to include the plural forms as well, unless the context clearly indicates otherwise. All terms (including technical and scientific terms) used herein have the same meaning as generally understood by one of ordinary skill in the art. Terms such as "first" and "second" may be used to designate various elements, but the elements should not be limited by these terms. These terms are merely used to distinguish one element from another.

It will be understood that the terms "comprises", "comprising", "includes" and/or "including", when used herein, specify the presence of stated elements, but do not preclude the presence or addition of one or more other elements, unless otherwise indicated herein. As used herein, the term "unit" or "module" denotes an entity for performing at least one function or operation, and may be implemented as hardware, software, or a combination of hardware and software.

Hereinafter, the disclosure will be described in detail by explaining embodiments of the disclosure with reference to the attached drawings. The disclosure may, however, be embodied in many different forms and should not be construed as being limited to the embodiments of the disclosure set forth herein.

Reference will now be made in detail to embodiments of the disclosure, examples of which are illustrated in the accompanying drawings.

The disclosure provides a method and electronic device for recognizing a product, based on fusion feature information in which a correlation between feature information of different modalities is reflected.

According to an embodiment of the disclosure, a method of recognizing a product includes obtaining first feature information and second feature information from an image related to a product, obtaining fusion feature information based on the first feature information and the second feature information by using a main encoder model that reflects a correlation between feature information of different modalities, matching the fusion feature information against a database of the product, and providing information about the product, based on a result of the matching.

The main encoder model may receive at least one piece of the first feature information and at least one piece of the second feature information as an input, obtain an attention value of any one piece of feature information in the image by identifying a correlation between the any one piece of feature information and all pieces of input feature information, based on self-attention, and output the fusion feature information by summing up attention values of the all pieces of input feature information.

The main encoder model may identify the correlation between the any one piece of feature information and the all pieces of input feature information through matrix multiplication between a query vector extracted from the any one piece of feature information and key vectors extracted from the all pieces of input feature information, and obtain the attention value by calculating a weighted sum in which the identified correlation is reflected.

The first feature information may be image feature information, and the second feature information may be text feature information.

The obtaining of the first feature information and the second feature information may include dividing the image into a first element and a second element, extracting a first feature from the first element divided from the image and encoding the extracted first feature as the first feature information, by using a first sub-encoder model, and extracting a second feature from the second element divided from the image and encoding the extracted second feature as the second feature information, by using a second sub-encoder model.

The method may further include matching the first feature information and the second feature information against the database of the product, when the fusion feature information does not match.

The method may further include updating the main encoder model in such a manner that the non-matching fusion feature information matches the database of the product, when one of the first feature information and the second feature information matches the database of the product.

The method may further include registering the product in the database of the product as a new product, when the first feature information and the second feature information do not match the database of the product.

The method may further include receiving the main encoder model and the database of the product from at least one server configured to train the main encoder model and manage the database of the product.

The method may further include obtaining through a camera the image related to the product, by executing a product recognition application, based on an input of a user.

According to an embodiment of the disclosure, an electronic device for recognizing a product includes a display, a memory storing one or more instructions, and a processor configured to execute the one or more instructions stored in the memory. The processor may be further configured to execute the one or more instructions to obtain first feature information and second feature information from an image related to a product, and obtain fusion feature information based on the first feature information and the second feature information by using a main encoder model that reflects a correlation between feature information of different modalities. The processor may be further configured to execute the one or more instructions to match the fusion feature information against a database of the product, and provide information about the product on the display, based on a result of the matching.

The main encoder model may receive at least one piece of the first feature information and at least one piece of the second feature information as an input, obtain an attention value of any one piece of feature information in the image by identifying a correlation between the any one piece of feature information and all pieces of input feature information, based on self-attention, and output the fusion feature information by summing up attention values of the all pieces of input feature information.

The main encoder model may identify the correlation between the any one piece of feature information and the all pieces of input feature information through matrix multiplication between a query vector extracted from the any one piece of feature information and key vectors extracted from the all pieces of input feature information, and obtain the attention value by calculating a weighted sum in which the identified correlation is reflected.

The processor may be further configured to execute the one or more instructions to divide the image into a first element and a second element, extract a first feature from the first element divided from the image and encode the extracted first feature as the first feature information, by using a first sub-encoder model, and extract a second feature from the second element divided from the image and encode the extracted second feature as the second feature information, by using a second sub-encoder model.

The processor may be further configured to execute the one or more instructions to match the first feature information and the second feature information against the database of the product, when the fusion feature information does not match.

The processor may be further configured to execute the one or more instructions to update the main encoder model in such a manner that the non-matching fusion feature information matches the database of the product, when one of the first feature information and the second feature information matches the database of the product.

The processor may be further configured to execute the one or more instructions to register the product in the database of the product as a new product, when the first feature information and the second feature information do not match the database of the product.

The electronic device may further include a communication interface, and the processor may be further configured to execute the one or more instructions to receive the main encoder model and the database of the product through the communication interface from at least one server configured to train the main encoder model and manage the database of the product.

The electronic device may further include a camera, and the processor may be further configured to execute the one or more instructions to execute a product recognition application and obtain through the camera the image related to the product, based on an input of a user.

According to an embodiment of the disclosure, a computer-readable recording medium having recorded thereon a program for executing the above-described method may be provided.

FIG. 1 is a diagram showing a product recognition process performed by an electronic device, according to an embodiment of the disclosure.

Referring to FIG. 1, an electronic device 100 may include a portable device such as a smartphone, smart glasses, a wearable device, a personal digital assistant (PDA), or a mobile scanner, but is not limited thereto. The electronic device 100 may be implemented as various types and forms of devices including an input means for obtaining an image, and an output means for providing information.

In this disclosure, a product refers to any item that may be purchased or sold. For example, the product may include daily necessaries, industrial products, and electronic products.

A user of the electronic device 100, for example, a customer who desires to purchase the product, may use the electronic device 100 to obtain information about the product. The user may search for the information about the product by directly inputting, to the electronic device 100, information on a label attached to the product. More simply, the user may capture an image of the label attached to the product, by using a camera included in the electronic device 100. The electronic device 100 may obtain the information about the product by executing a certain algorithm based on the captured image of the label.

Referring to FIG. 1, the user of the electronic device 100 may capture an image of a label of a wine by using a camera function of the electronic device 100 to obtain information about the wine. The product is illustrated as the wine in FIG. 1 but is not limited thereto, and the following description assumes the wine as the product for convenience of explanation.

The electronic device 100 may perform a process for recognizing the product, based on the captured image related to the product, i.e., the image of the label. To this end, the electronic device 100 may have stored a feature information encoder model in a memory.

The feature information encoder model may output a plurality of pieces of feature information from the image related to the wine. The feature information encoder model may include one or more models for encoding and outputting feature information. Each model may have a form of a neural network including a plurality of layers.

For example, the feature information encoder model illustrated in FIG. 1 may output at least one piece of feature information for recognizing the wine, based on an image or text, for example, characters, numbers, or symbols, included in the label of the wine.

The electronic device 100 may recognize the wine, based on the at least one piece of feature information obtained using the feature information encoder model, and provide information about the recognized wine to the user. For example, the electronic device 100 may match the at least one piece of feature information against a database that stores information about the wine, and provide the information about the wine, based on the result of the matching.

Figure 2:
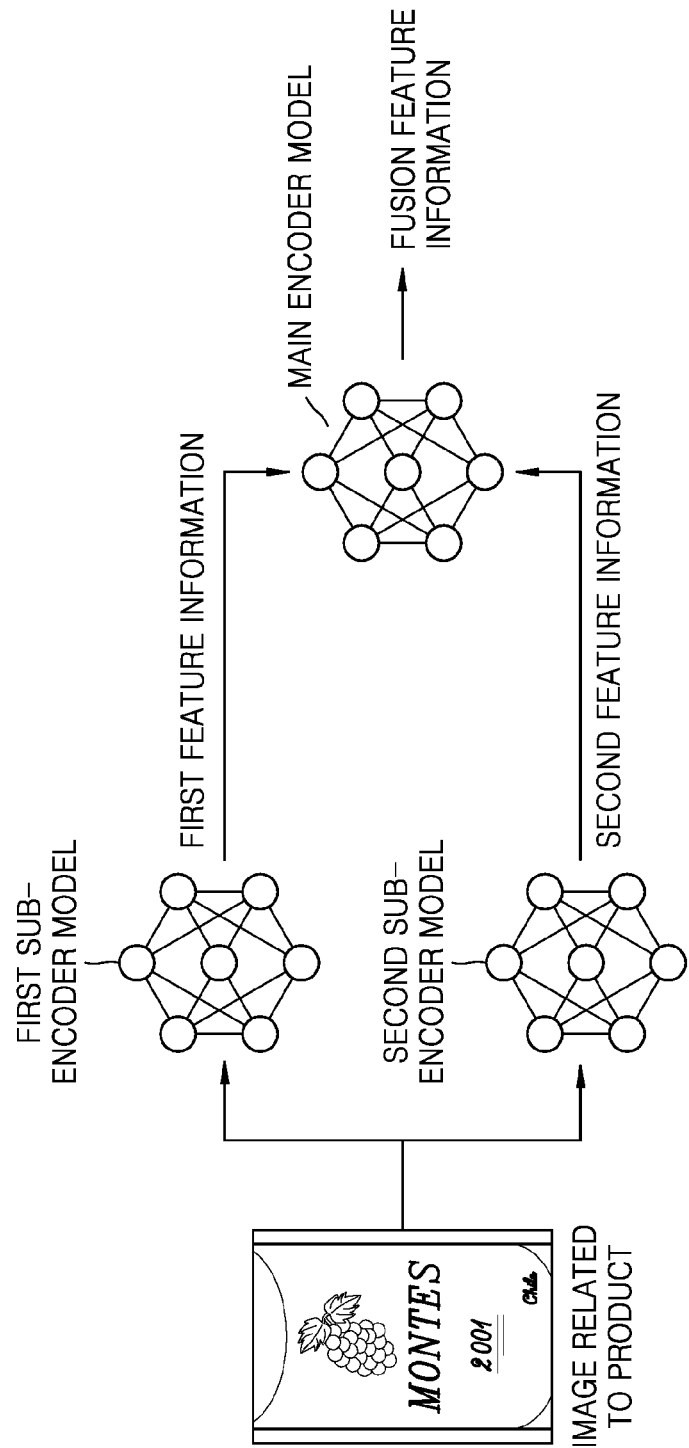
FIG. 2 is a diagram for describing a feature information encoder model used in a product recognition process, according to an embodiment of the disclosure.

FIG. 2 is a diagram for describing a feature information encoder model used in a product recognition process, according to an embodiment of the disclosure.

The feature information encoder model may encode and output feature information from an image related to a product. The feature information encoder model may include encoder models corresponding to the feature information to be encoded.

Referring to FIG. 2, the feature information encoder model may include a first sub-encoder model, a second sub-encoder model, and a main encoder model. However, unlike the illustration of FIG. 2, types or the number of encoder models included in the feature information encoder model may be changed depending on types or the number of pieces of feature information used for product recognition.

The first and second sub-encoder models receive the image related to the product as an input, but output feature information of different modalities. The image related to the product may be divided into a first element and a second element, based on types of elements included in the image. For example, the first element may be an image element, and the second element may be a text element. The image related to the product may be divided into the image element and the text element, considering properties of an image area and a text area.

The first sub-encoder model may extract a first feature from the first element divided from the image, and encode the extracted first feature as first feature information. The first sub-encoder model may have a form of a neural network including a plurality of layers. For example, the first feature information may be image feature information. The image feature information may be information indicating features about the appearance of shapes, patterns, colors, and the like, identified from an image.

The second sub-encoder model may extract a second feature from the second element divided from the image, and encode the extracted second feature as second feature information. The second sub-encoder model may have a form of a neural network including a plurality of layers. For example, the second feature information may be text feature information. The text feature information may be information indicating features about the meaning of characters, numbers, symbols, and the like, identified from text.

The first feature information output from the first sub-encoder model and the second feature information output from the second sub-encoder model may serve as an input of the main encoder model. The main encoder model may receive at least one piece of the first feature information and at least one piece of the second feature information as an input. For example, m pieces of the first feature information and n pieces of the second feature information may be input to the main encoder model. Unlike the illustration of FIG. 2, the main encoder model may also receive at least one piece of third feature information of a modality different from those of the first feature information and the second feature information.

The main encoder model may encode fusion feature information by reflecting a correlation between feature information of different modalities. As feature information newly made from feature information of different modalities, the fusion feature information may be obtained by fusing the first feature information and the second feature information, but is not limited thereto, and may be obtained by further fusing feature information of a different modality. For example, new feature information may be encoded by fusing the image feature information and the text feature information.

The main encoder model may obtain an attention value of any one piece of feature information in the image related to the product by identifying a correlation between the any one piece of feature information and all pieces of feature information input to the main encoder model, based on self-attention. The correlation refers to the relevance or significance between pieces of feature information. The main encoder model may obtain the attention value of the any one piece of feature information by calculating a weighted sum in which the identified correlation is reflected. The main encoder model may obtain an attention value for each of the all pieces of feature information input to the main encoder model. Each attention value may be a context vector considering the significance or feature of each piece of feature information relative to the other pieces of feature information. The main encoder model may output the fusion feature information of the image related to the product by summing up attention values of all pieces of feature information.

Consequently, the feature information encoder model may obtain the first feature information and the second feature information from the image related to the product, and obtain the fusion feature information based on the first feature information and the second feature information by using the main encoder model. The fusion feature information has a value in which the significances and features of at least one piece of the first feature information and at least one piece of the second feature information in the image related to the product are reflected. A value of the fusion feature information may be identified through matching against a database of the product, and be used to recognize the product.

A case in which the first feature information is image feature information and the second feature information is text feature information is described below as an example for convenience of explanation, but the first feature information and the second feature information are not limited thereto. Specific operations for recognizing the product will now be described in detail with reference to FIGS. 3 to 10.

Figure 3:
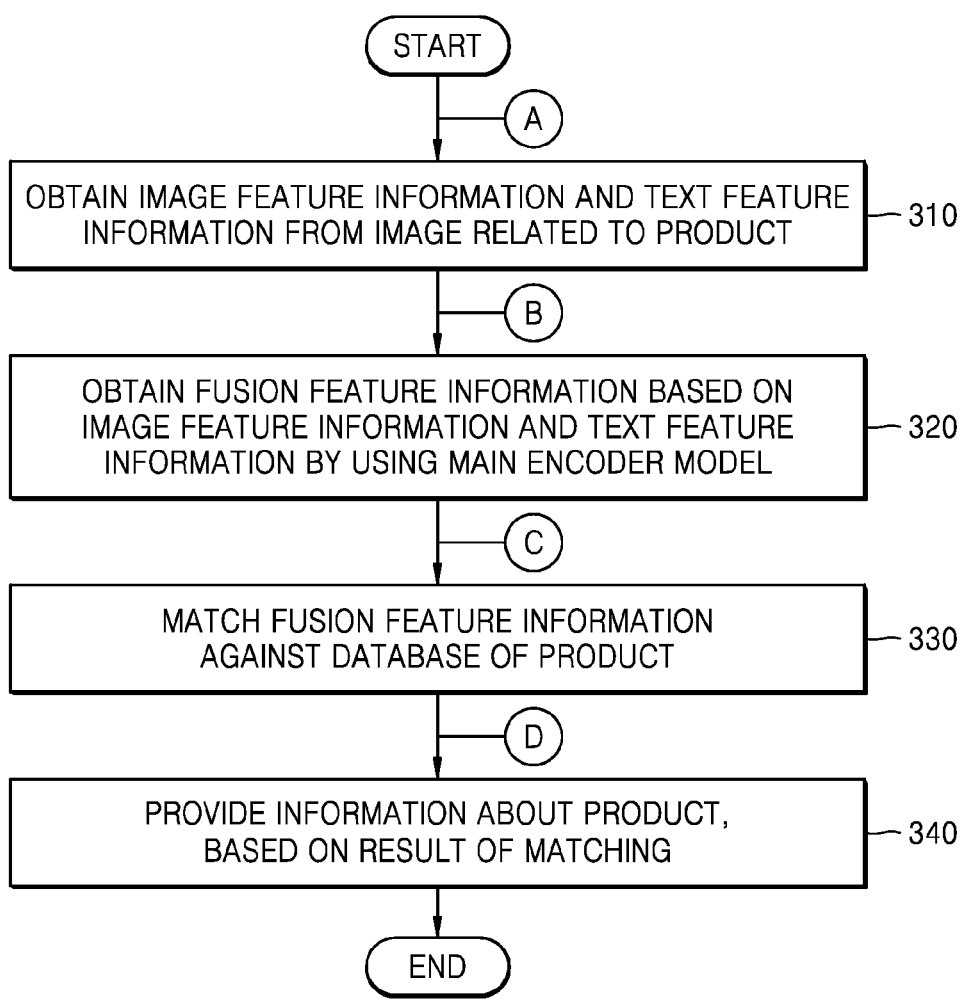
FIG. 3 is a flowchart for describing a method of recognizing a product, according to an embodiment of the disclosure.

FIG. 3 is a flowchart for describing a method of recognizing a product, according to an embodiment of the disclosure.

Referring to FIG. 3, in operation 310, the electronic device 100 may obtain image feature information and text feature information from an image related to a product. The image related to the product may be obtained through a camera of the electronic device 100 by executing a product recognition application, based on an input of a user. Operation 310 will now be described in detail with reference to FIG. 4.

Figure 4:
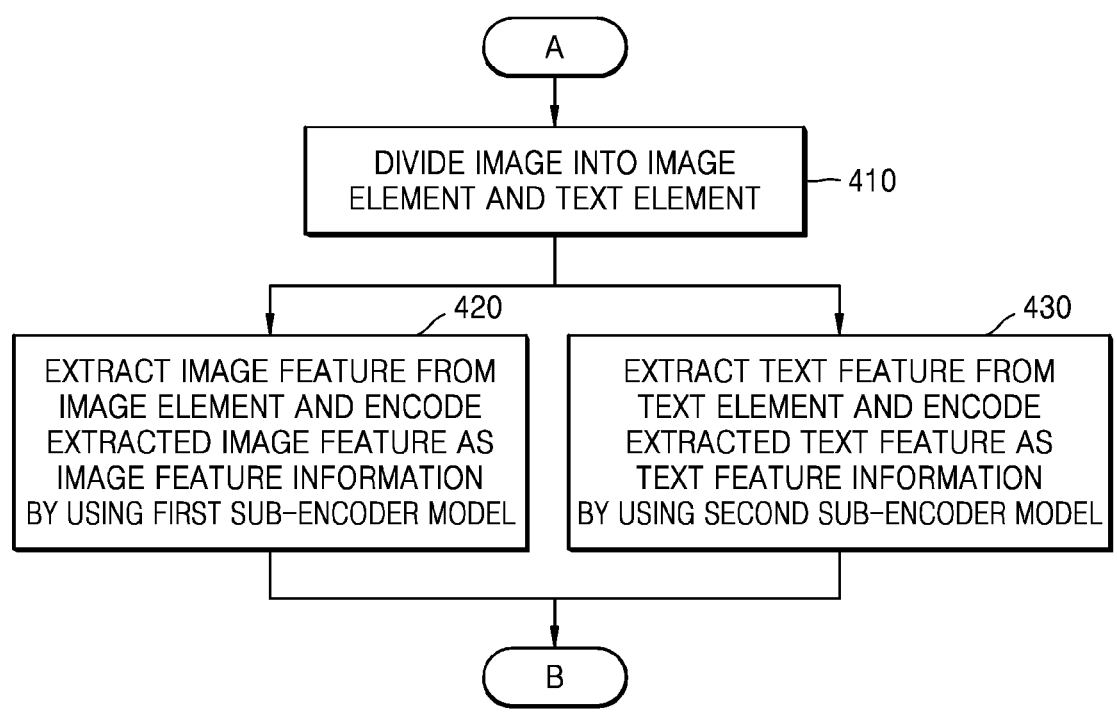
FIG. 4 is a flowchart for describing a process of obtaining image feature information and text feature information, according to an embodiment of the disclosure.

FIG. 4 is a flowchart for describing a process of obtaining image feature information and text feature information, according to an embodiment of the disclosure.

Referring to FIG. 4, the electronic device 100 may divide an image related to a product into an image element and a text element in operation 410. The image related to the product may be divided into the image element and the text element, based on properties of each element included in the image. For example, the electronic device 100 may detect an image area in the image by identifying edges of objects in the image related to the product. The electronic device 100 may detect a text area in the image by executing an optical character recognition (OCR) function. The detected at least one image area may be determined as the image element, and the detected at least one text area may be determined as the text element.

When the product is a wine, at least one image area related to the wine may be included in a label of the wine. For example, the mark of a winery where the wine is made and a symbol shaped like grapes corresponding to the raw material of the wine may be included in the label. In addition, at least one text area related to the wine may be included in the label of the wine. For example, the name of the wine, the vintage of the wine, and the place of origin of the wine may be included in the label.

The electronic device 100 may extract an image feature from the image element divided from the image and encode the extracted image feature as image feature information by using a first sub-encoder model in operation 420. The first sub-encoder model may be a neural network including a plurality of layers, and the image element may be input to an input layer thereof and the image feature information may be output from an output layer thereof. When a plurality of image areas are detected from the image related to the product, the first sub-encoder model may extract a plurality of image features, encode each image feature as image feature information, and output a plurality of pieces of image feature information.

For example, the image feature information may be represented as a vector obtained by encoding a feature about the shape of an image corresponding to the image area included in the label of the wine. When a plurality of image features are extracted from the label of the wine, the first sub-encoder model may output each of a plurality of vectors as the image feature information.

The electronic device 100 may extract a text feature from the text element divided from the image and encode the extracted text feature as text feature information by using a second sub-encoder model in operation 430. The second sub-encoder model may be a neural network including a plurality of layers, and the text element may be input to an input layer thereof and the text feature information may be output from an output layer thereof. When a plurality of text areas are detected from the image related to the product, the second sub-encoder model may extract a plurality of text features, encode each text feature as text feature information, and output a plurality of pieces of text feature information.

For example, the text feature information may be a vector obtained by encoding a feature about the meaning of text corresponding to the text area included in the label of the wine. When a plurality of text features are extracted from the label of the wine, the second sub-encoder model may output each of a plurality of vectors as the text feature information.

Referring back to FIG. 3, in operation 320, the electronic device 100 may obtain fusion feature information based on the image feature information and the text feature information by using a main encoder model that reflects a correlation between different pieces of feature information. Operation 320 will now be described in detail with reference to FIG. 5.

Figure 5:
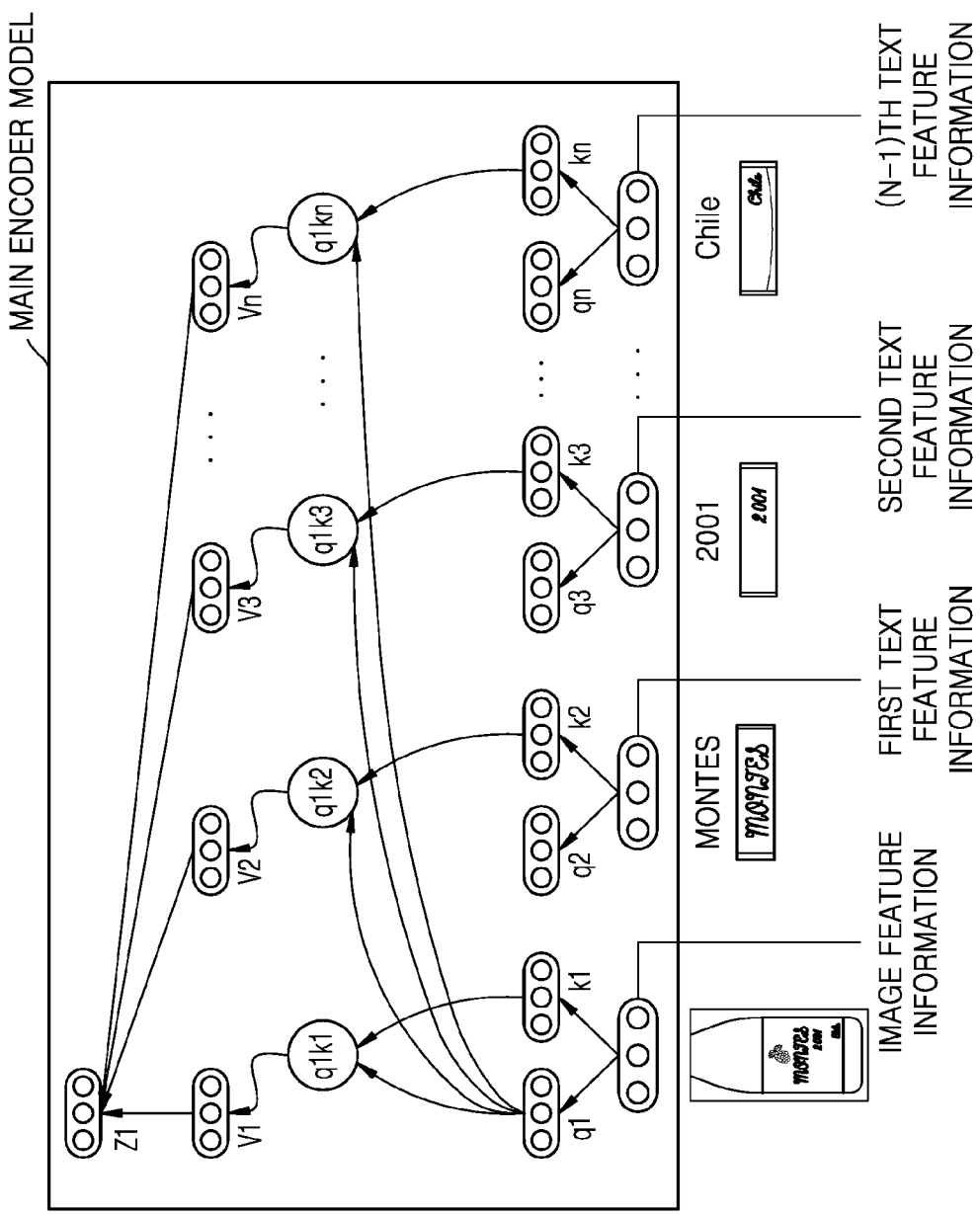
FIG. 5 is a diagram for describing a main encoder model according to an embodiment of the disclosure.

FIG. 5 is a diagram for describing a main encoder model according to an embodiment of the disclosure.

The main encoder model may receive at least one piece of image feature information and at least one piece of text feature information as an input.

Referring to FIG. 5, one piece of the image feature information and n−1 pieces of the text feature information may be input to an input layer of the main encoder model. One vector corresponding to the image feature information output from the above-described first sub-encoder model and n−1 vectors corresponding to the text feature information output from the above-described second sub-encoder model may be input to the input layer of the main encoder model.

For example, as illustrated in FIG. 5, one image feature corresponding to one image area may be extracted and encoded from a label of a wine, and one piece of the image feature information may be input to the input layer of the main encoder model. In addition, three text areas may be detected from the label of the wine, three text features corresponding to 'MONTES' indicating the name of the wine, '2001' indicating the vintage of the wine, and 'Chile' indicating the place of origin of the wine may be extracted and encoded by using an OCR function, and three pieces of the text feature information may be input to the input layer of the main encoder model.

The main encoder model may obtain an attention value of any one piece of feature information in an image related to a product by identifying a correlation between the any one piece of feature information and all pieces of feature information input to the main encoder model, based on self-attention. The main encoder model may identify the correlation between the any one piece of feature information and the all pieces of input feature information through matrix multiplication between a query vector extracted from the any one piece of feature information and key vectors extracted from the all pieces of input feature information. In this case, the correlation refers to the relevance or significance between pieces of feature information. The main encoder model may obtain the attention value of the any one piece of feature information by calculating a weighted sum in which the identified correlation is reflected. The main encoder model may obtain an attention value for each of the all pieces of feature information input to the main encoder model.

For example, referring to FIG. 5, using at least one vector extraction layer and at least one calculation layer connected to the input layer of the main encoder model, a context vector corresponding to the attention value may be obtained for each of the all pieces of feature information input to the input layer.

A first query vector q1 and a first key vector k1 may be extracted from a first vector corresponding to the image feature information input to the input layer of the main encoder model. A second query vector q2 and a second key vector k2 may be extracted from a second vector corresponding to the text feature information 'MONTES' input to the input layer of the main encoder model. A third query vector q3 and a third key vector k3 may be extracted from a third vector corresponding to the text feature information '2001' input to the input layer of the main encoder model. An nth query vector qn and an nth key vector kn may be extracted from an nth vector corresponding to the text feature information 'Chile' input to the input layer of the main encoder model.

Then, for each of all pieces of specific information input to the input layer of the main encoder model, a context vector corresponding to the attention value may be obtained as described below.

Initially, to identify a correlation between the first vector corresponding to image feature information, and the all pieces of feature information, inner product values q1k1, q1k2, q1k3, ..., q1kn may be calculated through matrix multiplication between the first query vector q1 and the first to nth key vectors k1 to kn. The inner product value is high when a piece of feature information has a high correlation with the image feature information corresponding to the first vector, which contextually means that the relevance therebetween is also high. By calculating a weighted sum of value vectors of the all pieces of feature information by using weights obtained by performing softmax on the inner product values, the meaning of the image feature information in the image related to the product, that is, the label of the wine, may be represented as a context vector V1.

Then, to identify a correlation between the second vector corresponding to first text feature information 'MONTES', and the all pieces of feature information, inner product values q2k1, q2k2, q2k3, . . . , q2kn may be calculated through matrix multiplication between the second query vector q2 and the first to nth key vectors k1 to kn. By calculating a weighted sum of value vectors of the all pieces of feature information by using weights obtained by performing softmax on the inner product values, the meaning of the first text feature information 'MONTES' in the label of the wine may be represented as a context vector V2.

In a similar manner, to identify a correlation between the third vector corresponding to second text feature information '2001', and the all pieces of feature information, inner product values q3k1, q3k2, q3k3, . . . , q3kn may be calculated through matrix multiplication between the third query vector q3 and the first to nth key vectors k1 to kn. By calculating a weighted sum of value vectors of the all pieces of feature information by using weights obtained by performing softmax on the inner product values, the meaning of the second text feature information '2001' in the label of the wine may be represented as a context vector V3.

Lastly, to identify a correlation between the nth vector corresponding to (n−1)th text feature information 'Chile', and the all pieces of feature information, inner product values qnk1, qnk2, qnk3, . . . , qnkn may be calculated through matrix multiplication between the nth query vector qn and the first to nth key vectors k1 to kn. By calculating a weighted sum of value vectors of the all pieces of feature information by using weights obtained by performing softmax on the inner product values, the meaning of the (n−1)th text feature information 'Chile' in the label of the wine may be represented as a context vector Vn.

Each attention value in the form of a context vector may be a value in which the contextual meaning of each piece of feature information relative to the other pieces of feature information in the image related to the product is reflected.

The main encoder model may output a vector Z1 corresponding to fusion feature information, by summing up the attention values of the all pieces of feature information, i.e., the context vectors V1, V2, V3, . . . , Vn. Consequently, the fusion feature information may be a new type of feature information in which the meanings of at least one piece of the image feature information and at least one piece of the text feature information in the image related to the product are all reflected. That is, a new type of feature information which understands the context by utilizing both morphological feature information and semantic feature information may be encoded from the image related to the product.

Referring back to FIG. 3, in operation 330, the electronic device 100 may match the fusion feature information against a database of the product. Operation 330 will now be described in detail with reference to FIG. 6.

Figure 6:
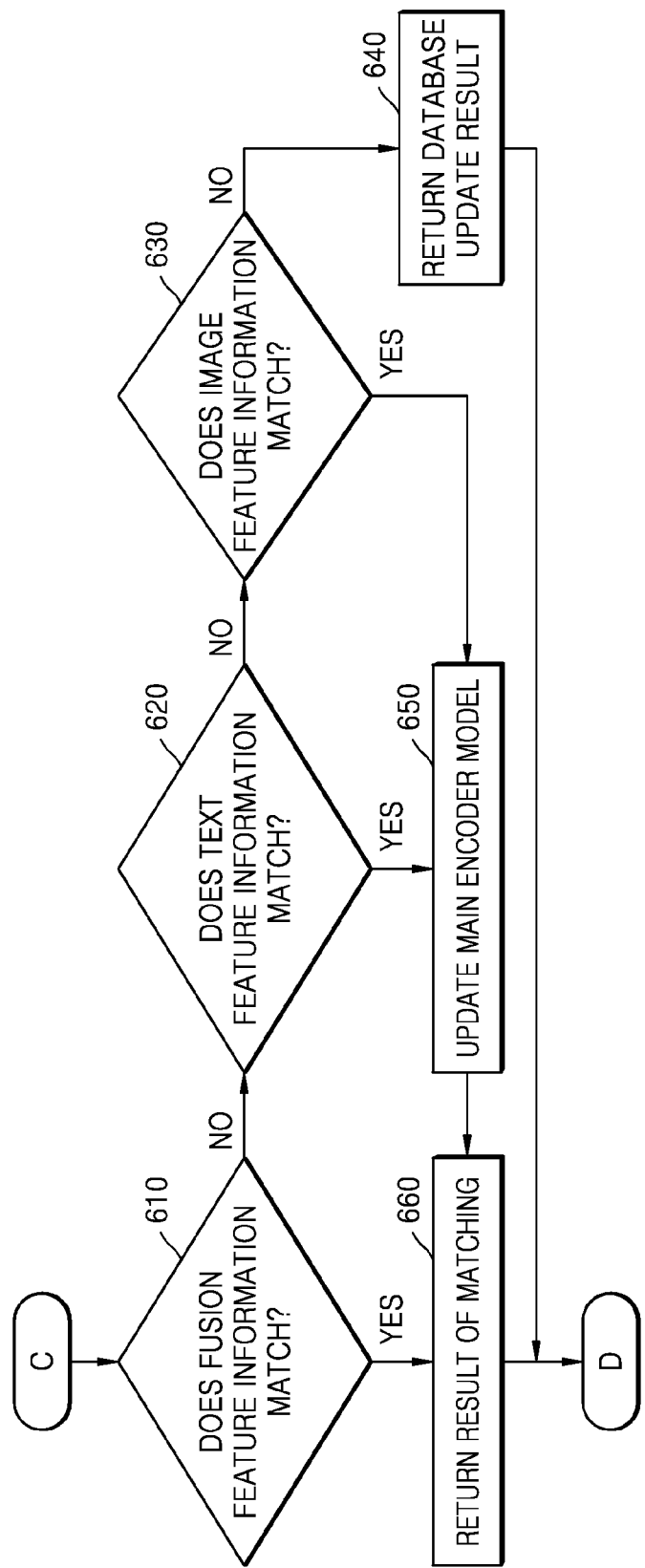
FIG. 6 is a flowchart for describing a process of matching one or more pieces of feature information including fusion feature information, against a database of a product, according to an embodiment of the disclosure.

FIG. 6 is a flowchart for describing a process of matching one or more pieces of feature information including fusion feature information, against a database of a product, according to an embodiment of the disclosure.

Referring to FIG. 6, in operation 610, the electronic device 100 may determine whether fusion feature information matches a database of a product. The electronic device 100 may compare the fusion feature information to information registered in the database of the product, and determine whether matching information exists.

When the fusion feature information does not match the database of the product, the electronic device 100 may match image feature information and text feature information against the database of the product.

When the fusion feature information does not match the database of the product, in operation 620, the electronic device 100 may first determine whether the text feature information matches the database of the product. When the text feature information includes a plurality of pieces of text feature information, the electronic device 100 may match each of the plurality of pieces of text feature information against the database of the product.

When the text feature information does not match the database of the product, in operation 630, the electronic device 100 may determine whether the image feature information matches the database of the product. When the image feature information includes a plurality of pieces of image feature information, the electronic device 100 may match each of the plurality of pieces of image feature information against the database of the product.

Figure 7:
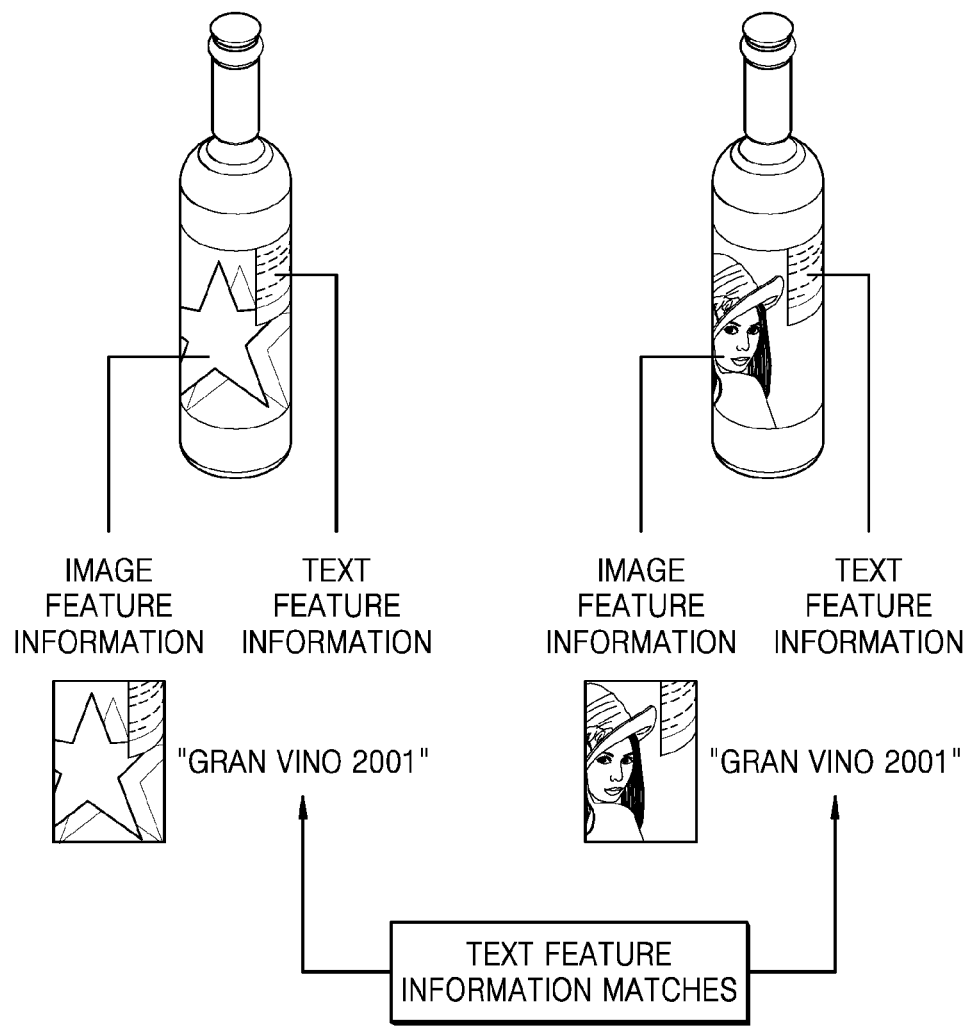
FIG. 7 is a diagram for describing an example in which text feature information matches according to an embodiment of the disclosure.

FIG. 7 is a diagram for describing an example in which text feature information matches according to an embodiment of the disclosure.

Referring to FIG. 7, it is shown that a design of a label attached to a wine is changed. Specifically, it is shown that two wines correspond to the same product but are provided with labels of different designs. One of the two wines is wine that a customer desires to purchase, and the other is wine registered in a database of the product.

In this case, pieces of image feature information encoded from the labels of the two wines are different from each other. However, pieces of text feature information encoded from the labels of the two wines may be identical to each other. As illustrated in FIG. 7, because 'Gran Vino 2001' is encoded as the text feature information from both of the two wines, the text feature information of the wine that the customer desires to purchase may match the information stored in the database of the product.

Figure 8:
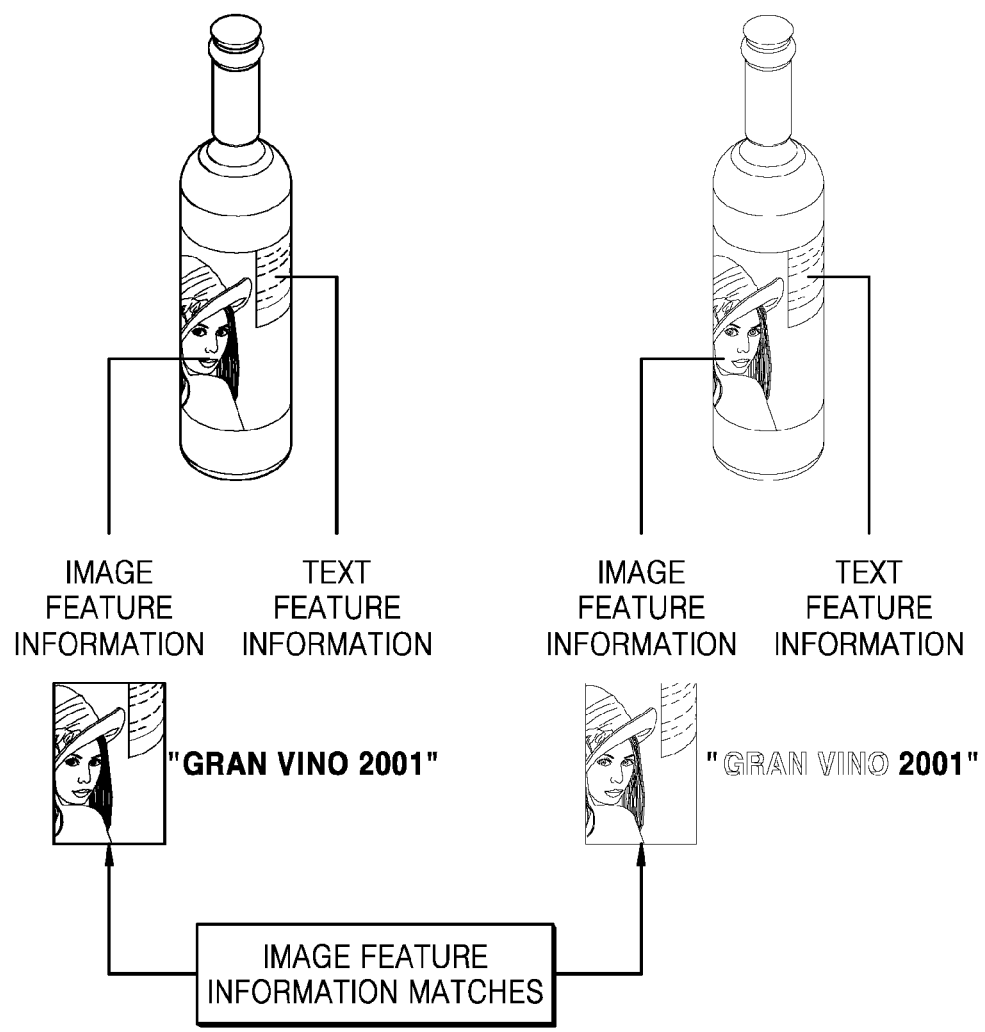
FIG. 8 is a diagram for describing an example in which image feature information matches according to an embodiment of the disclosure.

FIG. 8 is a diagram for describing an example in which image feature information matches according to an embodiment of the disclosure.

Referring to FIG. 8, it is shown that a label attached to a wine is faded or damaged. Specifically, it is shown that two wines correspond to the same product but a label of a wine that a customer desires to purchase is faded or damaged during distribution.

In particular, when a text area of the label is faded or damaged, pieces of text feature information encoded from the labels of the two wines are different from each other. However, pieces of image feature information encoded from the labels of the two wines may be identical to each other. As illustrated in FIG. 8, 'Gran Vino 2001' may be encoded as the text feature information from the first wine, and 'Gran Vino' may be faded and only '2001' may be encoded as the text feature information from the second wine as a result of executing OCR. Consequently, the pieces of text feature information of the two wines may not match. However, because features about shapes of image areas of the labels of the two wines are almost identical, the pieces of image feature information encoded from the labels of the two wines may match. As illustrated in FIG. 8, the image feature information of the wine that the customer desires to purchase may match the information stored in the database of the product.

When the text feature information and the image feature information do not match the database of the product, in operation 640, the electronic device 100 may register the product in the database of the product as a new product, thereby updating the database.

When one of the image feature information and the text feature information matches the database of the product, in operation 650, the electronic device 100 may update the main encoder model in such a manner that the fusion feature information which does not match the database of the product in operation 610 matches the database of the product.

For example, the fusion feature information may be distorted due to partial damage or contamination of an image related to the product, or OCR misrecognition. In this case, the fusion feature information may not match the database of the product but the text feature information or image feature information encoded from a normal area of the image related to the product may match the database of the product. The non-matching fusion feature information may be a sample requiring continual learning. When the main encoder model is updated through continual learning, subsequent fusion feature information distorted similarly may match the database of the product.

Referring back to FIG. 6, in operation 660, when one of the fusion feature information, the text feature information, and the image feature information matches the database of the product, the electronic device 100 may return the result of the matching. The electronic device 100 may retrieve information about a matching product from the database of the product.

Referring back to FIG. 3, in operation 340, the electronic device 100 may provide information about the product, based on the result of the matching. When the database of the product includes a matching product, the electronic device 100 may provide information about the matching product on a display. When the database of the product does not include a matching product, the electronic device 100 may notify that the database of the product does not include the product and that information about the product is updated in the database of the product.

Figure 9:
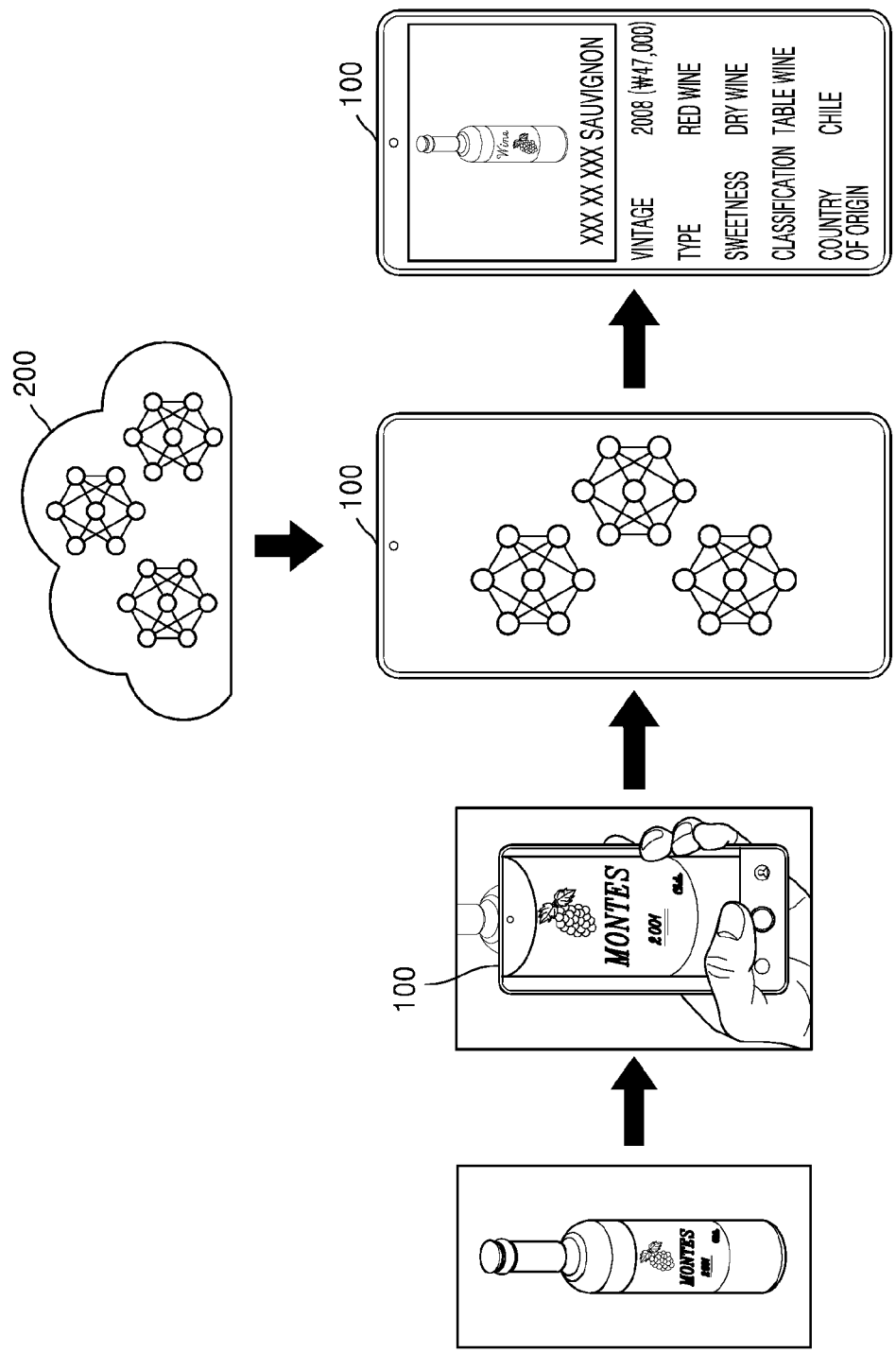
FIG. 9 is a diagram showing a case in which a product recognition process is operated by an electronic device, according to an embodiment of the disclosure.

FIG. 9 is a diagram showing a case in which a product recognition process is operated by an electronic device, according to an embodiment of the disclosure.

A server 200 may include at least one function server. A first server may train a feature information encoder model, and more particularly, a main encoder model. When a sample requiring learning occurs, the first server may train the main encoder model by using the sample. A second server may manage a database of a product. When information about the product is changed or registration of a new product is required, the second server may update the database of the product with new information.

The electronic device 100 may update a main encoder model stored in the electronic device 100, by receiving the trained main encoder model from the server 200. The electronic device 100 may keep a database stored in the electronic device 100 up to date by receiving the database of the product from the server 200. The electronic device 100 may receive the main encoder model and the database of the product from the server 200 periodically or whenever a product recognition application is executed.

As described above, when the electronic device 100 receives the database of the product and the feature information encoder model including the main encoder model from the server 200 and store the same in the electronic device 100, the electronic device 100 may operate the product recognition process in an on-device manner.

Referring to FIG. 9, the electronic device 100 may obtain through a camera an image related to a wine, that is, a label of the wine, by executing a wine recognition application, based on an input of a user. The electronic device 100 may obtain image feature information and text feature information from the label of the wine by using first and second sub-encoder models of the feature information encoder model. The electronic device 100 may obtain fusion feature information based on the image feature information and the text feature information by using the main encoder model of the feature information encoder model. The electronic device 100 may match at least one piece of feature information including the fusion feature information, against a database of the wine. The electronic device 100 may provide information about the wine on a display, based on the result of the matching.

Figure 10:
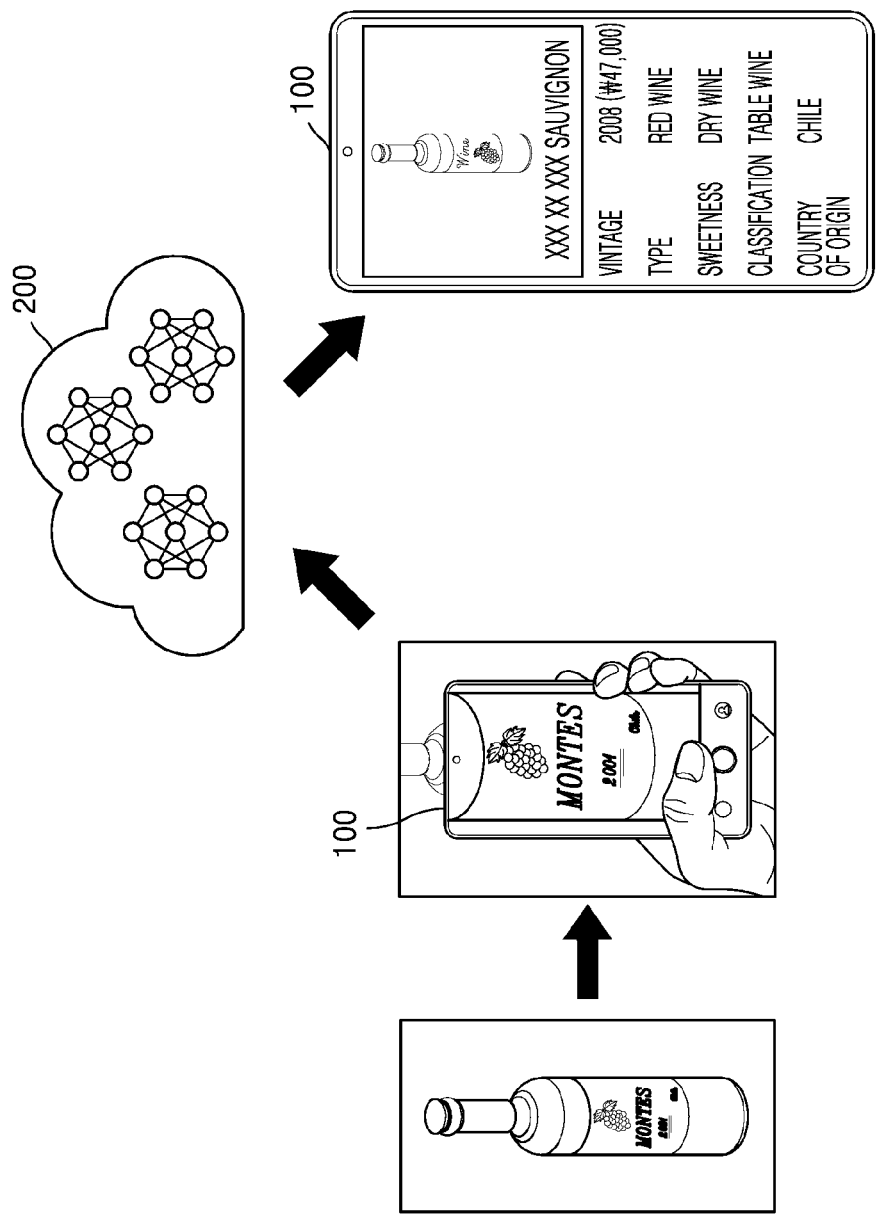
FIG. 10 is a diagram showing a case in which a product recognition process is operated based on an electronic device and a server, according to an embodiment of the disclosure.

FIG. 10 is a diagram showing a case in which a product recognition process is operated based on an electronic device and a server, according to an embodiment of the disclosure.

Although a method of recognizing a product is performed by the electronic device 100 in the above description for convenience of explanation, the product recognition process may be performed in association with the server 200 connected to the electronic device 100. The above description of the product recognition method performed by the electronic device 100 may also be applied to the embodiment of FIG. 10.

Referring to FIG. 10, the server 200 may train a feature information encoder model, and more particularly, a main encoder model, and manage a database of the product. The electronic device 100 may not receive the main encoder model or the database of the product from the server 200 and, instead, an image related to a product, which is obtained by the electronic device 100, may be transmitted to the server 200. As described above, when the database of the product and the feature information encoder model including the main encoder model are not stored in the electronic device 100, the product recognition process may be operated based on the electronic device 100 and the server 200.

Referring again to FIG. 10, the electronic device 100 may transmit, to the server 200, an image related to a wine, that is, a label of the wine, which is obtained through a camera. The server 200 may obtain image feature information and text feature information from the label of the wine by using first and second sub-encoder models of the feature information encoder model. The server 200 may obtain fusion feature information based on the image feature information and the text feature information by using the main encoder model of the feature information encoder model. The server 200 may match at least one piece of feature information including the fusion feature information, against a database of the wine. The server 200 may transmit the result of the matching to the electronic device 100. The electronic device 100 may provide information about the wine on a display, based on the received result of the matching.

Figure 11:
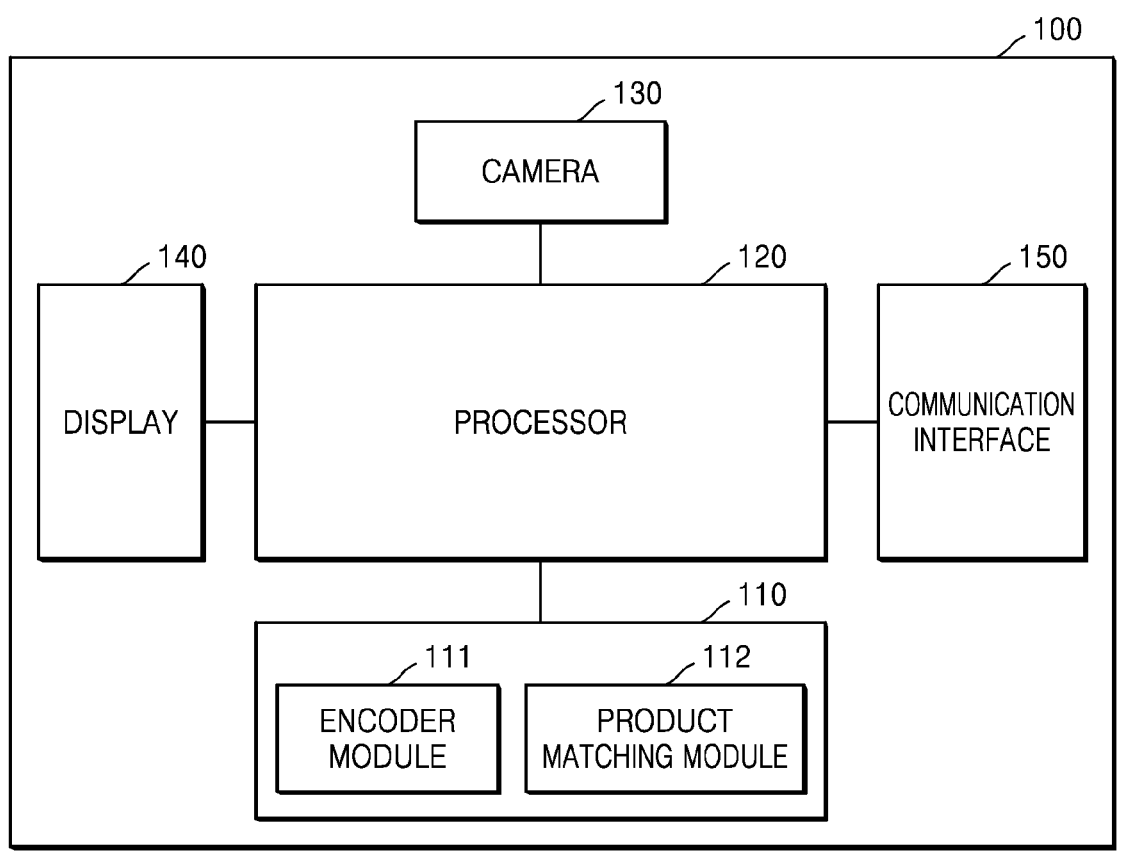
FIG. 11 is a block diagram of an electronic device according to an embodiment of the disclosure.

FIG. 11 is a block diagram of an electronic device according to an embodiment of the disclosure.

Referring to FIG. 11, the electronic device 100 according to an embodiment of the disclosure may include a memory 110, a processor 120, a camera 130, a display 140, and a communication interface 150.

The memory 110 may store instructions, data structures, and program codes readable by the processor 120. In an embodiment of the disclosure, operations performed by the processor 120 may be implemented by executing instructions or codes of programs stored in the memory 110.

The memory 110 may include flash memory type, hard disk type, multimedia card micro type, or card type (e.g., secure digital (SD) or extreme digital (XD) memory) memory, and include non-volatile memory including at least one of read-only memory (ROM), electrically erasable programmable read-only memory (EEPROM), programmable read-only memory (PROM), magnetic memory, a magnetic disk, or an optical disc, and volatile memory such as random access memory (RAM) or static random access memory (SRAM).

The memory 110 according to an embodiment of the disclosure may store one or more instructions and/or programs for controlling the electronic device 100 to recognize a product. For example, the memory 110 may store an encoder module 111 and a product matching module 112. When training of an artificial intelligence (AI) model within the electronic device 100 is required, the memory 110 may further store a model training module.

The processor 120 may control an operation or function performed by the electronic device 100, by executing the instructions or programmed software module stored in the memory 110. The processor 120 may include hardware elements for performing arithmetic, logic, and input/output calculation and signal processing. The processor 120 may control overall operations of the electronic device 100 to recognize a product, by executing the one or more instructions stored in the memory 110.

The processor 120 may include at least one of, for example, a central processing unit (CPU), a microprocessor, a graphics processing unit (GPU), an application-specific integrated circuit (ASIC), a digital signal processor (DSP), a digital signal processing device (DSPD), a programmable logic device (PLD), or a field-programmable gate array (FPGA), an application processor (AP), a neural processing unit (NPU), or a dedicated AI processor designed with a hardware structure specialized for processing AI models, but is not limited thereto. Each processor included in the processor 120 may be a dedicated processor for performing a certain function.

The camera 130 is a hardware module for obtaining an image. The camera 130 may capture an image related to a product. The camera 130 may include at least one camera module, and support, for example, close-up, depth-of-field, telephoto, wide-angle, and super-wide-angle functions according to specifications of the electronic device 100.

The display 140 may include an outputter for providing information or an image, and further include an inputter for receiving an input. The outputter may include a display panel and a controller for controlling the display panel, and be implemented with various types, e.g., an organic light-emitting diode (OLED) display, an active-matrix organic light-emitting diode (AM-OLED) display, or a liquid crystal display (LCD). The inputter may receive various types of inputs from a user, and include at least one of a touch panel, a keypad, or a pen-recognition panel. The display 140 may be provided in the form of a touchscreen in which a display panel and a touch panel are combined, and implemented to be flexible or foldable.

The communication interface 150 may communicate with another device or a network in a wired or wireless manner. The communication interface 150 may include a communication circuit or module supporting at least one of various wired/wireless communication methods. For example, the communication interface 150 may enable data communication between the electronic device 100 and other devices by using at least one of data communication methods, e.g., wired local area network (LAN), wireless LAN, Wi-Fi, Bluetooth, ZigBee, Wi-Fi direct (WFD), Infrared Data Association (IrDA), Bluetooth low energy (BLE), near field communication (NFC), wireless broadband Internet (Wibro), world interoperability for microwave access (WiMAX), shared wireless access protocol (SWAP), wireless gigabit alliances (WiGig), and radio frequency (RF).

The communication interface 150 according to an embodiment of the disclosure may transmit or receive an AI model (e.g., a convolutional neural network (CNN)-based feature information encoder model or main encoder model) used to recognize the product, or sample data for training to or from an external device. The communication interface 150 may transmit, to the server 200, the image captured through the camera 130 of the electronic device 100, or receive a trained AI model or a database from the server 200.

The processor 120 or a first processor included in the processor 120 may execute a product recognition application to control the electronic device 100 to obtain the image related to the product. The image related to the product may be obtained using the camera 130 of the electronic device 100 or received from an external device.

The processor 120 or a second processor included in the processor 120 may execute an encoder module to obtain first feature information and second feature information from the image related to the product and obtain fusion feature information based on the first feature information and the second feature information.

The processor 120 or the second processor may execute the encoder module to divide the image related to the product into a first element and a second element, encode the first feature information from the first element by using a first sub-encoder model, and encode the second feature information from the second element by using a second sub-encoder model. The processor 120 or the second processor may execute the encoder module to extract a first feature from the first element divided from the image related to the product and encode the extracted first feature as the first feature information by using the first sub-encoder model. The processor 120 or the second processor may execute the encoder module to extract a second feature from the second element divided from the image related to the product and encode the extracted second feature as the second feature information by using the second sub-encoder model.

The processor 120 or the second processor may execute the encoder module to obtain the fusion feature information based on the first feature information and the second feature information by using a main encoder model that reflects a correlation between feature information of different modalities.

The processor 120 or a third processor included in the processor 120 may execute a product matching module to match the fusion feature information against a database of the product. The processor 120 or the third processor may execute the product matching module to the first feature information and the second feature information against the database of the product, when the fusion feature information does not match. The processor 120 or the third processor may provide information about the product, based on the result of the matching.

When the fusion feature information does not match and when one of the first feature information and the second feature information matches the database of the product, the processor 120 or a fourth processor included in the processor 120 may execute a model training module to update the main encoder model in such a manner that the non-matching fusion feature information matches the database of the product. The processor 120 or the fourth processor may execute the model training module to train the main encoder model by using the non-matching fusion feature information, or control the main encoder model to be updated by receiving, from the server 200, the main encoder model trained using the non-matching fusion feature information.

The processor 120 or a fifth processor included in the processor 120 may register the product in the database of the product as a new product, when none of the fusion feature information, the first feature information, and the second feature information matches the database of the product.

Figure 12:
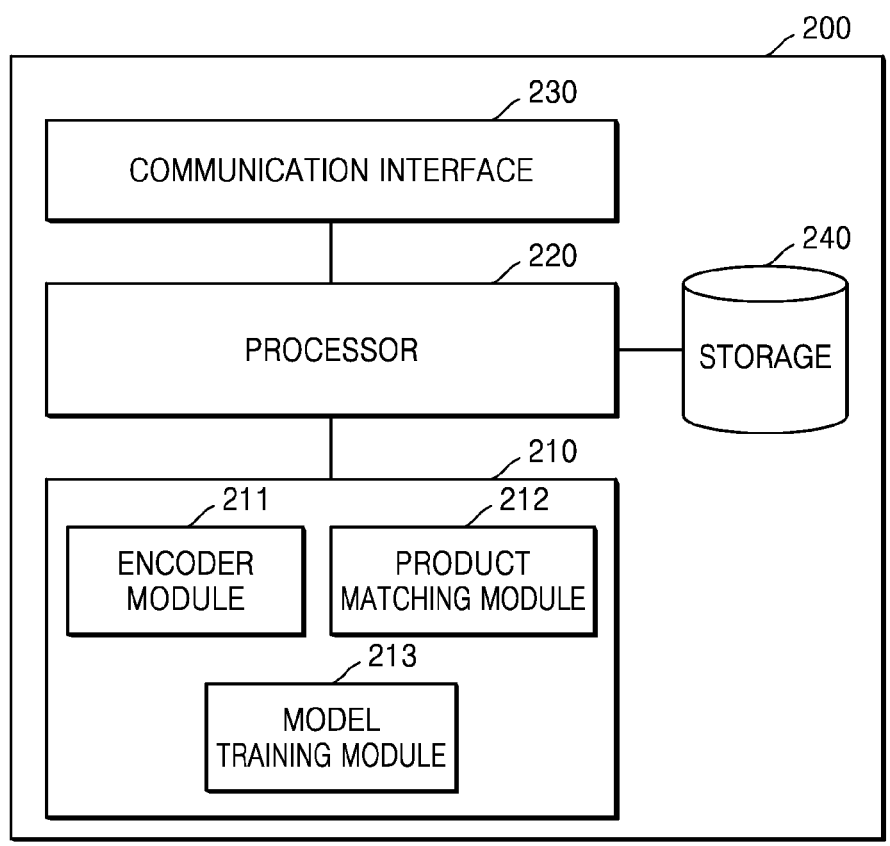
FIG. 12 is a block diagram of a server according to an embodiment of the disclosure.

FIG. 12 is a block diagram of the server 200 according to an embodiment of the disclosure.

The above-described operations of the electronic device 100 may be performed by the server 200 in a similar manner. The server 200 according to an embodiment of the disclosure may include a memory 210, a processor 220, a communication interface 230, and a storage 240. The memory 210, the processor 220, and the communication interface 230 of the server 200 may correspond to the memory 110, the processor 120, and the communication interface 150 of the electronic device 100 of FIG. 11, respectively, and thus repeated descriptions thereof will not be provided herein.

The memory 210 may store various types of data, programs, or applications for driving and controlling the server 200. One or more instructions or applications stored in the memory 210 may be executed by the processor 220. The memory 210 may store modules for performing the same functions as the modules stored in the electronic device 100. For example, the memory 210 may store an encoder module 211, a product matching module 212, a model training module 213, and data and program instruction codes corresponding thereto. The processor 220 may control the server 200 overall. The processor 220 according to an embodiment of the disclosure may execute the one or more instructions stored in the memory 210.

The communication interface 230 may include one or more elements for enabling communication based on a local area network (LAN), a wide area network (WAN), a value added network (VAN), a mobile radio communication network, a satellite communication network, or a combination thereof.

The storage 240 may store a feature information encoder model including a first sub-encoder model, a second sub-encoder model, and a main encoder model. The storage 240 may store a training dataset used to train various AI models. The storage 240 may store a database of the product which includes information about the product.

The server 200 according to an embodiment of the disclosure may have a higher computing performance than the electronic device 100 so as to perform more calculations faster than the electronic device 100. The server 200 may perform AI model training that requires a relatively large amount of computation.

An embodiment of the disclosure may be implemented in the form of recording media including computer-executable instructions, e.g., program modules executed by the computer. The computer-readable media may be any available media that can be accessed by the computer, and include both volatile and non-volatile media, and removable and non-removable media. The computer-readable media may include computer storage media and communication media.

The computer storage media include both volatile and non-volatile media, and removable and non-removable media implemented in any method or technology for storage of information such as computer-readable instructions, data structures, program modules, or other data. The communication media may typically include computer-readable instructions, data structures, program modules, or other data in modulated data signals.

The computer-readable storage media may be provided in the form of non-transitory storage media. When the storage medium is 'non-transitory', it means that the storage medium is tangible and does not include signals (e.g., electromagnetic waves), and it does not limit that data is semi-permanently or temporarily stored in the storage medium. For example, the 'non-transitory storage medium' may include a buffer storing data temporarily.

According to an embodiment of the disclosure, the method according to various embodiments of the disclosure may be included and provided in a computer program product. The computer program product may be traded as a commercial product between sellers and purchasers. The computer program product may be distributed in the form of machine-readable storage media (e.g., compact disc read-only memory (CD-ROM)), or be electronically distributed (e.g., downloaded or uploaded) via an application store or directly between two user devices (e.g., smartphones). For electronic distribution, at least a part of the computer program product (e.g., a downloadable app) may be temporarily generated or be at least temporarily stored in a machine-readable storage medium, e.g., memory of a server of a manufacturer, a server of an application store, or a relay server.

The above descriptions of the disclosure are provided for the purpose of illustration, and it will be understood by one of ordinary skill in the art that various changes in form and details may be easily made therein without departing from the scope of the disclosure. Therefore, it should be understood that the afore-described embodiments of the disclosure should be considered in a descriptive sense only and not for purposes of limitation. For example, each component described to be of a single type can be implemented in a distributed manner and, likewise, components described as being distributed can be implemented in a combined manner.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method of performed by an electronic device for recognizing a product, the method comprising:
 obtaining first feature information and second feature information from an image related to a product;
 obtaining fusion feature information based on the first feature information and the second feature information by using a main encoder model that reflects a correlation between feature information of different modalities;
 comparing the fusion feature information against a product database for a match to the fusion feature information in the product database; and
 providing information about the product, based on a result of the comparing of the fusion feature information against the product database being that there is the match to the fusion feature information in the product database;

comparing the first feature information and the second feature information against the product database for a match to the first feature information or the second feature information in the product database, based on the result of the comparing of the fusion feature information against the product database being that there is not the match to the fusion feature information in the product database; and updating the main encoder model in such a manner that there is a match to the non-matching fusion feature information in the product database, based on a result of the comparing of the first feature information and the second feature information against the product database being that there is the match to the first feature information or the second feature information in the product database.

2. The method of claim 1, wherein the main encoder model:

receives at least one piece of the first feature information and at least one piece of the second feature information as an input;

obtains an attention value of any one piece of feature information in the image by identifying a correlation between the any one piece of feature information and all pieces of input feature information, based on self-attention; and outputs the fusion feature information by summing up attention values of the all pieces of input feature information.

3. The method of claim 2, wherein the main encoder model:

identifies the correlation between the any one piece of feature information and the all pieces of input feature information through matrix multiplication between a query vector extracted from the any one piece of feature information and key vectors extracted from the all pieces of input feature information; and obtains the attention value by calculating a weighted sum in which the identified correlation is reflected.

4. The method of claim 1, wherein the first feature information is image feature information, and wherein the second feature information is text feature information.

5. The method of claim 4, wherein the image feature information includes information about at least one shape in an area of the image corresponding to a label of the product.

6. The method of claim 1, wherein the obtaining of the first feature information and the second feature information comprises:

dividing the image into a first element and a second element;

extracting a first feature from the first element divided from the image and encoding the extracted first feature as the first feature information, by using a first sub-encoder model; and extracting a second feature from the second element divided from the image and encoding the extracted second feature as the second feature information, by using a second sub-encoder model.

7. The method of claim 1, further comprising:

registering the product in the product database as a new product, based on the result of the comparing of the first feature information and the second feature information against the product database being that there is not the match to the first feature information or the second feature information in the product database.

8. The method of claim 1, further comprising:

receiving the main encoder model and the product database from at least one server individually or collectively configured to train the main encoder model and manage the product database.

9. The method of claim 1, further comprising:

executing a product recognition application, based on an input of a user, and obtaining, through a camera, the image related to the product.

10. An electronic device for recognizing a product, the electronic device comprising:

a memory storing instructions; and at least one processor communicatively coupled to the memory, wherein the instructions, when executed by the at least one processor individually or collectively, cause the electronic device to:

obtain first feature information and second feature information from an image related to a product, obtain fusion feature information based on the first feature information and the second feature information by using a main encoder model that reflects a correlation between feature information of different modalities, compare the fusion feature information against a product database for a match to the fusion feature information in the product database, provide information about the product, based on a result of the comparing of the fusion feature information against the product database being that there is the match to the fusion feature information in the product database, compare the first feature information and the second feature information against the product database for a match to the first feature information or the second feature information in the product database, based on the result of the comparing of the fusion feature information against the product database being that there is not the match to the fusion feature information in the product database, and update the main encoder model in such a manner that there is a match to the non-matching fusion feature information in the product database, based on a result of the comparing of the first feature information and the second feature information against the product database being that there is the match to the first feature information or the second feature information in the product database.

11. The electronic device of claim 10, wherein the instructions, when executed by the at least one processor individually or collectively, further cause the electronic device to perform at least one function of the main encoder model to:

receive at least one piece of the first feature information and at least one piece of the second feature information as an input, obtain an attention value of any one piece of feature information in the image by identifying a correlation between the any one piece of feature information and all pieces of input feature information, based on self-attention, and output the fusion feature information by summing up attention values of the all pieces of input feature information.

12. The electronic device of claim 11, wherein the instructions, when executed by the at least one processor individually or collectively, further cause the electronic device to perform a at least one function of the main encoder model to:
    identify the correlation between the any one piece of feature information and the all pieces of input feature information through matrix multiplication between a query vector extracted from the any one piece of feature information and key vectors extracted from the all pieces of input feature information, and
    obtain the attention value by calculating a weighted sum in which the identified correlation is reflected.

13. The electronic device of claim 10, wherein the instructions, when executed by the at least one processor individually or collectively, further cause the electronic device to:
    divide the image into a first element and a second element,
    extract a first feature from the first element divided from the image and encode the extracted first feature as the first feature information, by using a first sub-encoder model, and
    extract a second feature from the second element divided from the image and encode the extracted second feature as the second feature information, by using a second sub-encoder model.

14. The electronic device of claim 10, wherein the instructions, when executed by the at least one processor individually or collectively, further cause the electronic device to:
    register the product in the product database as a new product, based on the result of the comparing of the first feature information and the second feature information against the product database being that there is not the match to the first feature information or the second feature information in the product database.

15. The electronic device of claim 10, further comprising:
    a communication interface,
    wherein the instructions, when executed by the at least one processor individually or collectively, further cause the electronic device to:
        receive the main encoder model and the product database, through the communication interface, from at least one server individually or collectively configured to:
            train the main encoder model, and
            manage the product database.

16. The electronic device of claim 10, further comprising:
    a camera,
    wherein the instructions, when executed by the at least one processor individually or collectively, further cause the electronic device to:
        execute a product recognition application, based on an input of a user, and
        obtain, through the camera, the image related to the product.

17. The electronic device of claim 10,
    wherein the first feature information is image feature information, and
    wherein the second feature information is text feature information.

18. The electronic device of claim 17, wherein the image feature information includes information about at least one shape in an area of the image corresponding to a label of the product.

19. A One or more non-transitory computer-readable storage media storing instructions that, when executed by at least one processor of an electronic device individually or collectively, cause the electronic device to perform operations, the operations comprising:
    obtaining first feature information and second feature information from an image related to a product;
    obtaining fusion feature information based on the first feature information and the second feature information by using a main encoder model that reflects a correlation between feature information of different modalities;
    comparing the fusion feature information against a product database for a match to the fusion feature information in the product database;
    providing information about the product, based on a result of the comparing of the fusion feature information against the product database being that there is the match to the fusion feature information in the product database;
    comparing the first feature information and the second feature information against the product database for a match to the first feature information or the second feature information in the product database, based on the result of the comparing of the fusion feature information against the product database being that there is not the match to the fusion feature information in the product database; and
    updating the main encoder model in such a manner that there is a match to the non-matching fusion feature information in the product database, based on a result of the comparing of the first feature information and the second feature information against the product database being that there is the match to the first feature information or the second feature information in the product database.

* * * * *